No. 763,989. PATENTED JULY 5, 1904.
H. LAUGHLIN, Jr.
APPARATUS FOR UTILIZING POWER FROM A SINGLE PRIME MOVER, &c.
APPLICATION FILED MAR. 5, 1900.
NO MODEL. 5 SHEETS—SHEET 3.
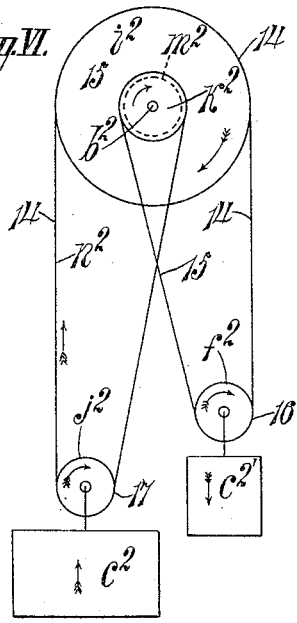
Fig. VI.
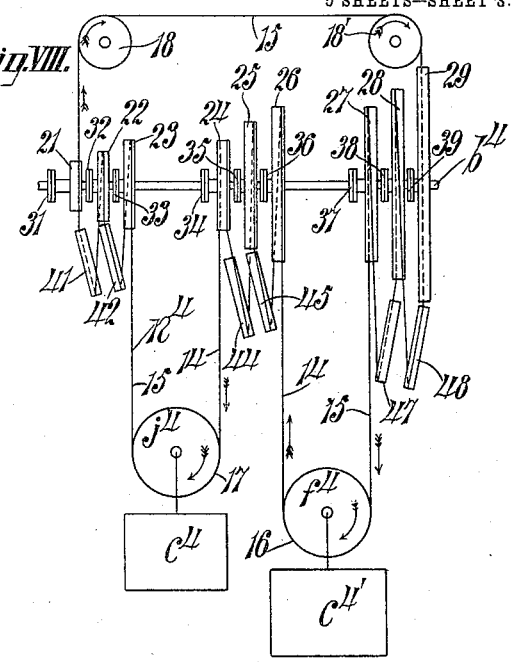
Fig. VIII.
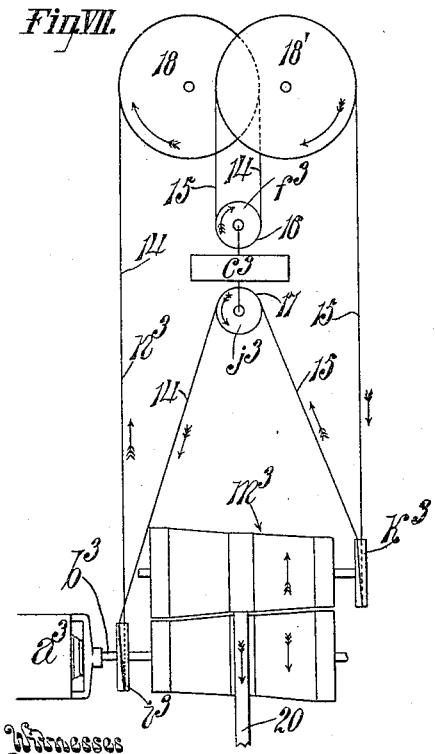
Fig. VII.
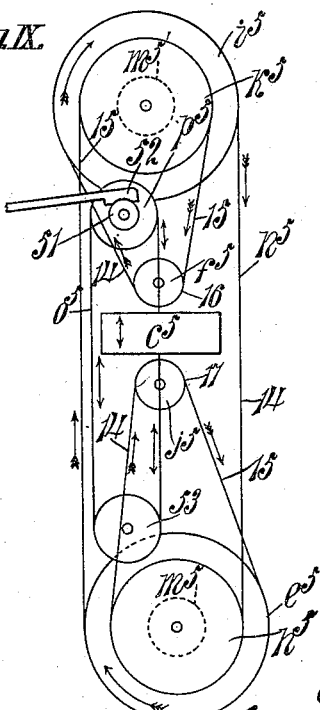
Fig. IX.
Witnesses
Inventor
Homer Laughlin Jr.
by Townsend Bro.
his attys.

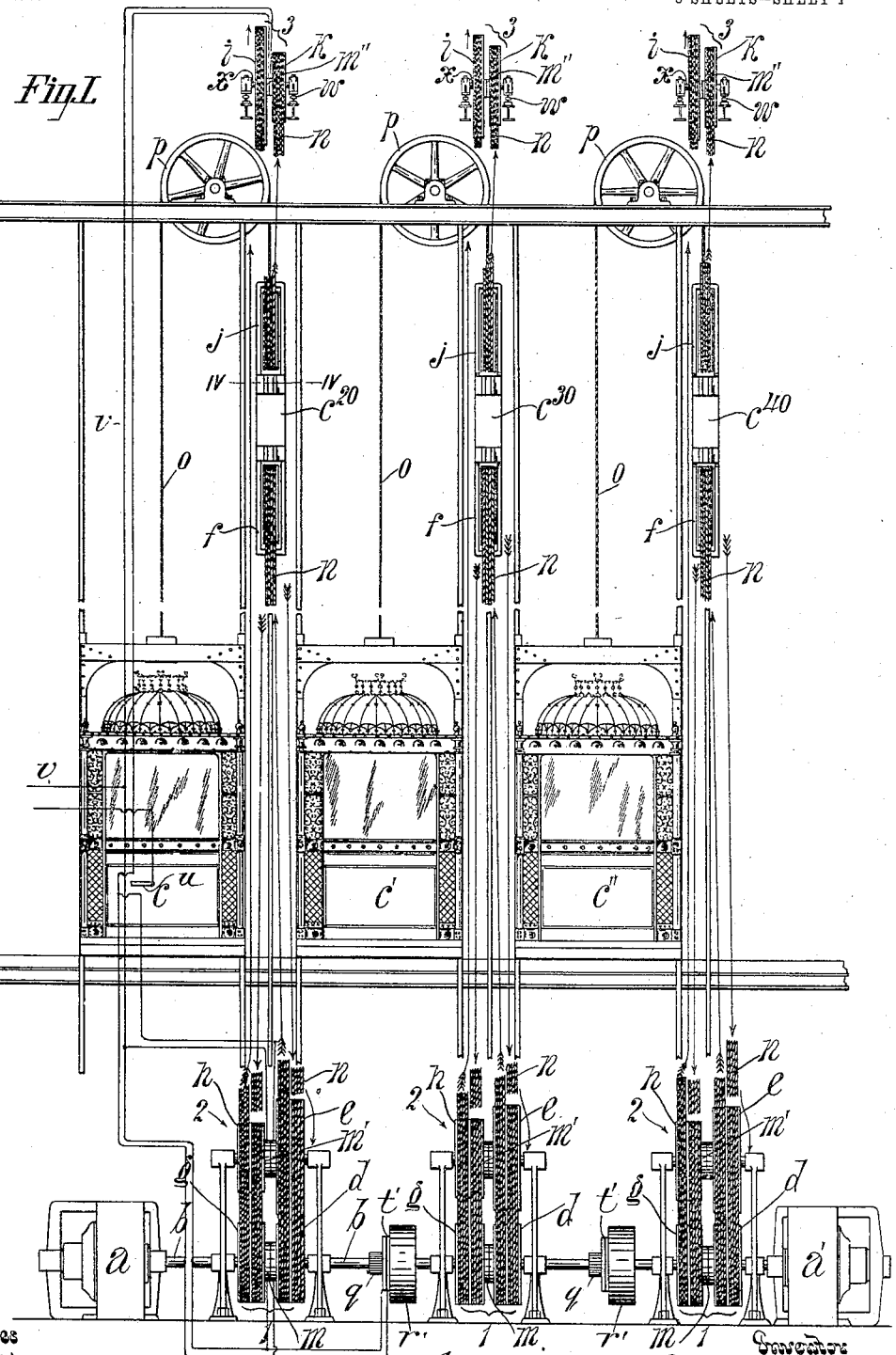

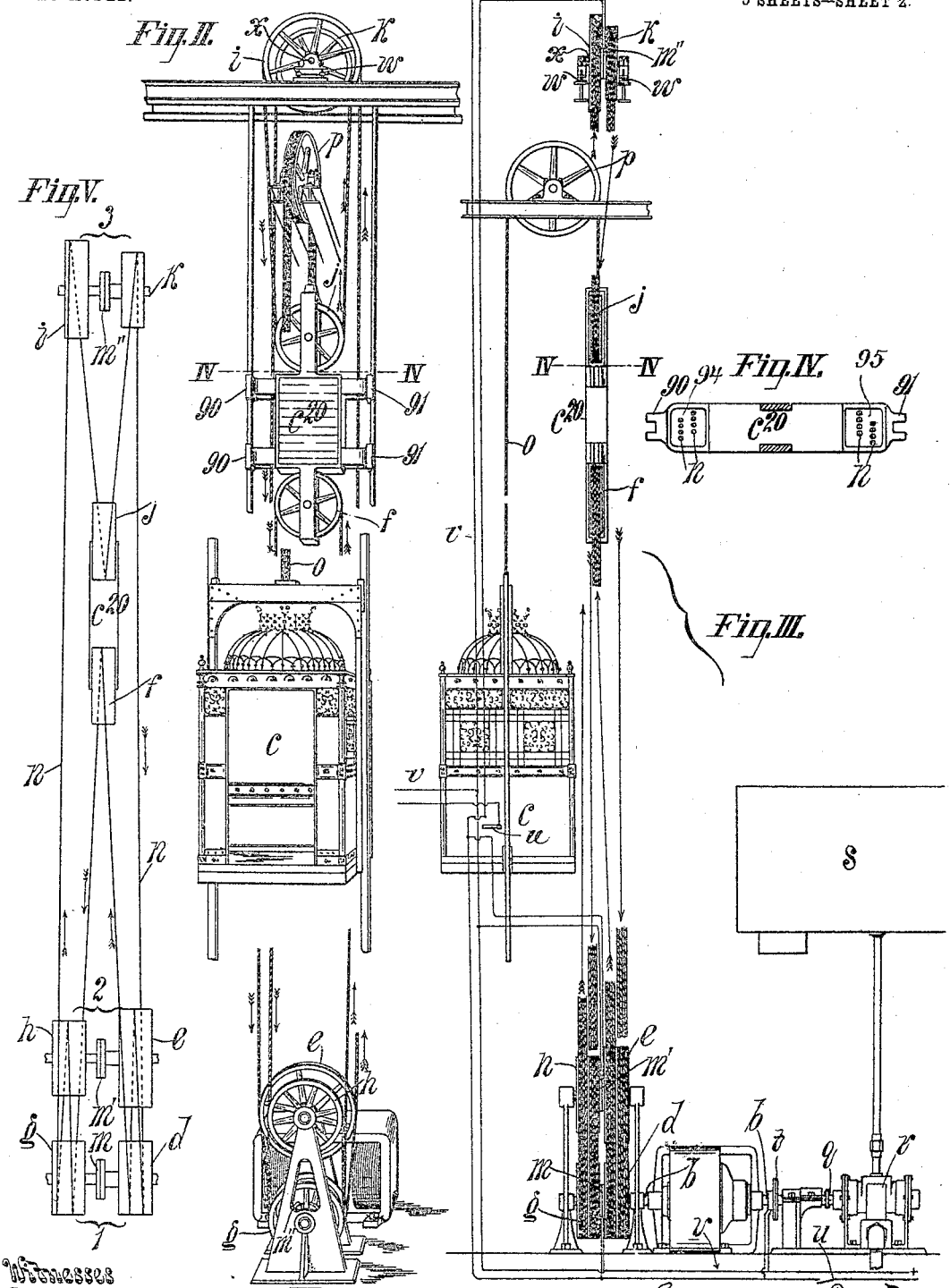

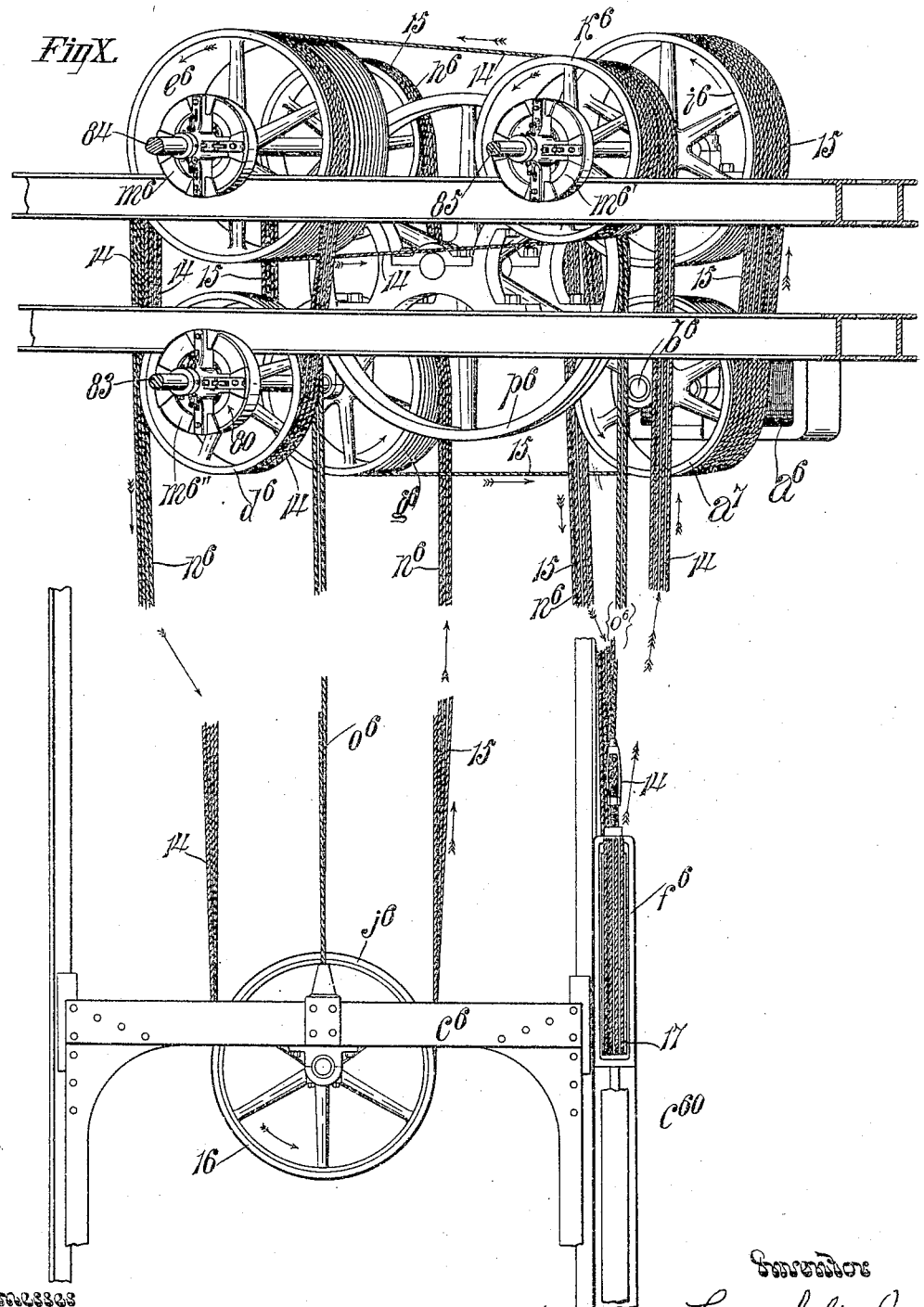

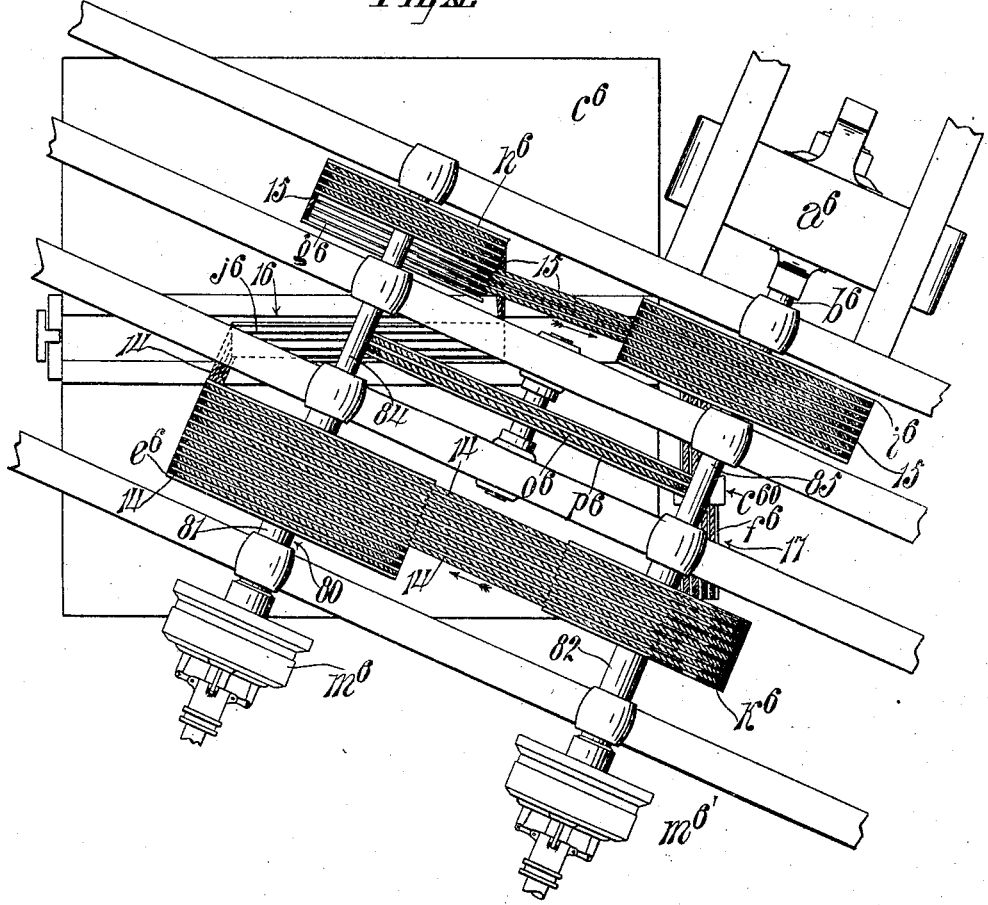

No. 763,989. Patented July 5, 1904.

UNITED STATES PATENT OFFICE.

HOMER LAUGHLIN, JR., OF LOS ANGELES, CALIFORNIA.

APPARATUS FOR UTILIZING POWER FROM A SINGLE PRIME MOVER, &c.

SPECIFICATION forming part of Letters Patent No. 763,989, dated July 5, 1904.

Application filed March 5, 1900. Serial No. 7,406. (No model.)

*To all whom it may concern:*

Be it known that I, HOMER LAUGHLIN, Jr., a citizen of the United States, residing at Los Angeles, in the county of Los Angeles and State of California, have invented a new and useful Apparatus for Utilizing Power from a Single Prime Mover Having Continuous Motion in One Direction, of which the following is a specification.

My invention includes means for applying power from a prime mover having one direction to intermittently move a load in opposite directions, and also includes an apparatus in which the power is diverted to other uses when it is not required for moving the primary load.

It also includes an apparatus in which a plurality of loads may be moved at various or like speeds simultaneously or separately by a single prime mover.

My invention is applicable for moving loads vertically, horizontally, or in any intermediate plane.

My invention relates to that class of appliances in which the power is transferred through an endless rope moving in one direction and includes certain means for applying said power through the endless rope to intermittently move the load in reverse direction and also to allow or to cause the load to stand still while the rope is moving.

It is customary in endless-rope devices to use one or more ropes, chains, or like appliances, and it is to be understood that in this specification I use the word "rope" as being inclusive of all like appliances.

My invention is more particularly intended for use with electrically-driven elevators. There are at present several characters of apparatus for operating elevators by electric prime movers, among which may be mentioned apparatus in which the electric motor is reversed in order to reverse the movement of the elevator. In another style of apparatus two motors are employed in connection with the endless rope, and the direction in which the load is moved is changed by changing the relative speeds of the two electric motors. A difficulty which presents itself with apparatus of this character arises from a necessity of slowing down and speeding up one or more electric motors. This requires rheostats of more or less complication, and consequently more or less loss of electrical energy.

In my invention I avoid the great loss which is presented in reversing an electric motor, and I also avoid the difficulty of synchronizing two independent prime movers, and also do away with any loss from slowing down and speeding up electric motors in the operation of the elevator.

It is an object of my invention in this connection to positively regulate the relative speeds of the loop members of the endless rope within fixed limits, so that no danger may arise from one member being stopped while the other continues to move at full speed.

An advantage to be gained by my invention over the endless rope driven by two motors is that with my invention it is not necessary to connect the prime mover with both loop members; but by applying the power to either loop member the apparatus will work, thereby allowing great latitude as to the location of the point at which the power may be applied.

My invention comprises an endless rope formed in two loop members led around stationary pulleys in said loop members, respectively, and around two load-pulleys which are at the dividing bights of said rope, respectively, between said loop members, and connectible and disconnectible speed-changing means for connecting one loop member to the other loop member, whereby the speed of one loop member is regulated by the speed of the other loop member. In carrying out my invention I prefer to use a pulley in one bight of said rope and fastened to the load to move the same, a pulley in another bight of the endless rope and fastened to the load to move the same, a stationary pulley in a loop of the rope between the load-pulleys to take the rope from one side of the first load-pulley and pay it to one side of the second load-pulley, a stationary pulley arranged in a loop of the rope to take the rope from the other side of the second load-pulley and pay it to the other side of the first load-pulley, and speed-changing means for connecting one loop member to the other loop member, whereby the speed of one loop member is regulated by the speed of the other loop member. The speed-changing means for connecting said loop members may be variously devised. In some instances differential means are provided by making some of the pulleys of a different diameter from others of the pulleys and providing means for connecting and disconnecting such pulleys with and from each other. If such connecting means change the speed to cause the rope in one loop member to run faster than the rope in the other loop member, the effect upon the load will be to move it in one or the other direction, depending upon the arrangement of the parts; but if the speed is not changed by the mechanism which connects the opposite loop members of the rope the load will not be moved by the movement of the rope. I therefore preferably provide three connecting and disconnecting appliances to be independently operated, one of said appliances being arranged to conserve the speed, while the other two of said appliances are arranged to cause the one loop member to travel faster than the other, and vice versa. Any number of loops and bights and speed-transforming appliances or devices may be employed with one endless rope, if desired, for the purpose of giving a great variety of speeds to the load. The speed-conserving device may be of any desirable form.

My invention includes a power-applying device comprising two pulleys fastened to a load to move the same, stationary pulleys, an endless rope bent around all of said pulleys and divided into two loop members by the load-pulleys, means for driving the rope continuously in one direction, one of the stationary pulleys being of smaller diameter and in a different loop member than another of said pulleys, and means for intermittently connecting and disconnecting pulleys of different diameters and of different loop members to move the load intermittently in one and the other direction. In the simplest mode of application by connecting pulleys of opposite loop members the load may be made to move in the one direction against the force of gravity, and disconnecting means may be employed to disconnect the pulleys, thus to allow the load to descend responsive to the force of gravity.

My invention further comprises three pairs of pulleys, two of said pairs being composed of pulleys of unequal diameters; means for two of said pairs to connect and disconnect the respective pulleys of such two pairs, respectively, with and from each other; an endless rope connected with a prime mover to be driven in one direction and running around all of said pulleys and being around stationary pulleys toward and away from which the load moves and around two pulleys which are fastened to the primary load and through which the power is finally applied to such load to move it, the pulleys of each pair being in opposite loop members of said rope.

In carrying out my invention various arrangements of pulleys may be employed and any desired number of pulleys may be used for directing the course or the mode of application of the power. The said loop members may each comprise any number of bends of the rope around any number of pulleys. It is ordinarily desirable that the operator shall have control over the load not only to move it in either direction at will, but also to hold the load stationary while the rope continues to move; and in accomplishing this purpose my invention includes a pair of pulleys of one diameter and means for connecting and disconnecting the pulleys of said pair with and from each other. The load may be positively made to move between stationary pulleys or all the stationary pulleys may be located above the load and the power applied only to carry the load up toward said stationary pulleys, gravity or other force being utilized to move the load in the opposite direction. The load may be unitary or it may be divided into two portions, which may be arranged to act as counterbalances for each other or may be positively connected, so that when the one part moves in one direction the other part will move in the other direction, and vice versa. The power may be applied from the prime mover to the rope independently of or through any of the pulleys hereinbefore mentioned.

This invention is applicable to operate a vertical elevator by means of a single electric motor which has a continuous movement in one direction. It is not subject to any of the complications and waste of energy due to slowing down or stopping an electric motor under full load nor to rheostatic waste, and may be applied to operate a vertical passenger or freight elevator by a single prime mover, which it is possible to run continuously at a uniform speed. I do not confine myself, however, to running the motor at a uniform speed in any instances where it may be deemed desirable to change the speed of the motor or to intermittently start and stop it; nor do I limit myself to a system devoid of rheostats, but I may, without departing from my invention, use one or more rheostats or any other device or devices which may be considered desirable.

Another object of my invention is to make use of a single prime mover moving continuously in one direction at a high speed to move a load at a relatively low speed without the use of cog-wheels, friction-gear, worm-gear, screw devices, dynamos, or auxiliary motors. This device is applicable to the independent operation of a plurality of elevators from a single shaft in a satisfactory manner and to independently operate at one or different speeds any desired number of elevators by power which is all taken from a single shaft which rotates continuously in one direction, while the stopping and starting of each elevator may be perfectly and independently controlled, each elevator being moved upward or downward or held stationary at the will of the operator in charge of such elevator.

For the purposes of this description the prime mover may be regarded as including any shaft or other suitable element rotated by one or more electric motors or by any other means for applying power.

The primary load may be an elevator alone or an elevator and a counterweight or may be any other form of load to be moved to and fro. Any form of accumulator or mechanism operated by a rotating shaft may constitute the secondary load. The pulleys which are fastened to said load to move the same may be applied to either a unitary load or to one of the parts of a divided load, or one of said pulleys may be fastened to one of said parts of said divided load and the other pulley fastened to the other of said parts.

An object of the invention is to make it possible to arrange the parts in such a way that so long as the endless rope does not slip on the pulleys the load will be sustained against the force of gravity without the use of brakes so long as the pulleys of any one of the said pairs are connected with each other.

Another object of my invention is to make it possible to arrange the parts in such a manner that any change of momentum due from increasing or decreasing the load will not affect the distance traveled by the load during the process of stopping the same—that is to say, in all the elevators that I have heretofore observed an automatic stop of uniform power would have been impossible of satisfactory operation, because if the brakes were applied in exactly the same manner under different loads the various momentums would prevent the brake from stopping the various loads at a uniform point. By my invention the use of an automatic stop is made practicable, though I have not attempted to show such a stop in the drawings.

Another object of my invention is to avoid as far as possible the strain and wear and constant weakening of the rope which occurs in apparatus of this kind as heretofore constructed. I accomplish this object by carrying the rope around the pulleys in such a manner that it is bent only toward one side and never toward the other side of the structure of the rope. It is to be understood, however, that I do not limit myself to the particular arrangements of the rope by which I gain this advantage, and it would not be a departure from my invention in other particulars to arrange the rope so that the flexure would be toward and from two or more sides of the structure of the rope.

Another object of my invention is to provide a superior elevator construction which is within the capacity of ordinary machine-shops without the use of special patterns or tools and to enable the apparatus to be operated by any character of electrical or other form of motor without any special adaptation of the same to such use.

In my invention I have made provision for a minimum torque of the motor in starting the same into operation. The movement of the load is wholly dependent upon the connection and disconnection of parts of the mechanism, which may be allowed to run freely continuously without moving the load, so that the motor and all of the operative parts may be brought to a full speed before the load is moved, and therefore the momentum of the moving parts is utilized to move the load.

In the practical operation of the invention a large part of the power is conserved by the momentum of the parts, which continue to move while the load is being brought to and held at a standstill, and such energy is again applied when the load is again moved. My invention therefore enables me to use a motor of less torque than would otherwise be required for a given load. It also enables me to control the electric motor by the simplest known means for that purpose.

An object of my invention is to provide means for conserving the power of the continuously-moving motor by diverting the same from the elevator or other load-moving system to operate other machinery or to store the power in accumulators whenever it is not being applied for moving the elevator or other load of the main system. This is of especial importance in elevator systems having a plurality of elevators which are being intermittently run, and I prefer to combine with such system an independent power-transmitting means for each of the elevators of the system and to provide means for connecting the independent power-transmitting means with the power when the elevator-car is stopped and to disconnect such means from such power when the elevator-car is being moved. By this means I constantly provide for the motors a load which approximates their load of maximum efficiency.

The independent means for utilizing the power of the motor when the load is standing still may be applied to take the power from any of the continuously-moving parts.

The power which drives the endless rope may be applied to such rope at any point by any suitable means and may be transferred from the endless rope to the load by many different arrangements of my invention, which is capable of application in a great multiplicity of forms. It would be impracticable to illustrate all of these forms in this application.

I will now describe the invention as applied in several of the modes of taking the power from the endless rope.

The accompanying drawings illustrate my invention in some of the modes of its application.

Figure I is a fragmental elevation of a system of elevators embodying my invention in a form in which each counterweight is moved positively between two pairs of fixed pulleys, and therefore independently of the force of gravity, and is connected with the elevator-car by a rope running over a sustaining-pulley. Fig. II is a fragmental perspective view of a single elevator of this character constructed in accordance with my invention. Fig. III is a fragmental elevation of the elevator shown in Fig. II viewed from the right side of said Fig. II. Fig. IV is a plan on line IV IV of the counterweight shown in Figs. II and III. Fig. V is a detail view showing the course of the endless rope over the pulleys for any of the elevators shown in the preceding views. Fig. VI is a detail view to illustrate an arrangement of the parts for carrying out my invention in a simple form in which the load is in two parts, one of which is moved in one direction by power applied through the endless rope and in the opposite direction by the force of gravity, the movement of the two parts of the load being complementary of each other. Fig. VII is a detail view to illustrate one construction of my invention as applied with pulleys of varying diameters. Fig. VIII is a detail view showing my invention as applied for moving the load at various speeds. Fig. IX is a detail view illustrating another method of applying my invention, in which the load may be positively moved to and fro by differential means. A brake is shown for holding the load when the differential pulleys are disconnected. Fig. X is a fragmental detail illustrating another one of the many forms in which my invention may be applied. Fig. XI is a plan of the form of apparatus shown in Fig. X.

In Fig. I, $a$ $a'$ indicate two electric motors, which may be separately or synchronously operated to drive a shaft $b$. In this instance the prime mover may be said to be constituted of either or both of the motors $a$ $a'$, together with shaft $b$.

$c$ $c'$ $c''$ indicate three elevator-cars of an elevator system.

$c^{20}$ $c^{30}$ $c^{40}$ indicate counterweights for the elevator-cars, respectively. For each of the elevators three pairs, 1 2 3, of stationary pulleys are provided, two of said pairs—viz., 2 and 3—being composed of pulleys of unequal diameters—that is to say, the pair 1 is shown composed of pulleys $d$ $g$ of equal diameters, and the pair 2 is composed of pulleys $e$ $h$ of unequal diameters, and the pair 3 is composed of pulleys $i$ $k$ of unequal diameters.

$f$ $j$ indicate pulleys fastened to the load to move the same. In the form illustrated in Fig. I each load is divided into two parts—viz., the car, as at $c$, and the counterweight, as at $c^{20}$—and the pulleys $f$ $j$ are shown attached to the counterweight $c^{20}$, one above and the other below the counterweight. Means are provided for two of said pairs of pulleys to connect and disconnect the respective pulleys of such two pairs, respectively, with and from each other. Such means may be any of many of the forms of cut-off couplings or other devices for connecting and disconnecting rotary parts. I contemplate using magnetic clutches of standard manufacture for this purpose in preference to any other form of connecting and disconnecting devices with which I am acquainted.

In the drawings, $m'$ indicates a cut-off coupling for the one pair of pulleys, and $m''$ indicates a cut-off coupling for another pair of pulleys. In constructions designed for stopping the load while the motor continues to run the pulleys of one of the three pairs of pulleys are made of one diameter, as exemplified in the case of the first pair of pulleys $d$ and $g$, (shown in Figs. I, II, III, and V,) and are provided with a cut-off coupling, as indicated at $m$.

$n$ indicates the endless rope through which the power is applied from the prime mover to move the load. In the form shown in Fig. I the pulley $d$ is fastened to the shaft $b$ to rotate therewith, and the endless rope $n$ runs around all of the pulleys of the pairs 1 2 3, and around the load-pulleys $f$ and $j$. In this case the counterweight plays between upper and lower stationary pulleys.

In Fig. I, $d$ $d$ $d$ indicate the driving-pulleys for the three elevator-cars $c$ $c'$ $c''$, respectively. All of these driving-pulleys are fastened to and rotate with the shaft $b$, which is driven by either or both the motors $a$ $a'$.

The arrangement of the rope is the same in Figs. I, II, and III, in which the planes of rotation of the several pulleys are parallel with each other. This arrangement will be clearly understood by reference to the diagrammatic view in Fig. V, where it will be seen that the endless rope $n$ is bent around the driving-pulley $d$ and led from the near side of said pulley to the near side of the pulley $e$, around which it is bent to the far side and thence led back to the far side of the pulley $d$ and again around said pulley $d$ to the near side and thence led to the near side of pulley $f$, around which it is bent to the far side and thence led to the far side of pulley $g$, around which it is bent to the near side and thence led to the near side of pulley $h$, around which it is bent to the far side and thence again led to the far side of the pulley $g$, around which it is bent to the near side and thence led to the near side of the pulley $i$, around which it is bent to the far side and thence led to the far side of the pulley $j$, around which it is bent to the near side and thence led to the near side of the pulley $k$, around which it is bent to the far side and thence led to the far side of the pulley $d$, around which it is bent to the point of starting. By this arrangement the bending of the rope is always in one direction from its axis, so that the rope is never flexed in opposite directions from its axis. By this means I avoid more than one-half of the destructive strain due to flexure which would arise if in bending around the pulleys the rope were flexed in opposite directions.

In the form shown in Figs. I, II, and III the elevator-cage $c$ is connected with the counterweight $c^{20}$ by a rope $o$, which passes over a sustaining-pulley $p$, so that the movement of the car, cage, or platform is dependent on that of the counterweight.

In elevators or other apparatus where the power is intermittently applied for moving the load I prefer to provide independent power-transmitting means and to connect the same with an accumulator—such, for instance, as the accumulator for a hydraulic elevator.

In Figs. I and III, $q'$ and $q$ indicate a shaft independent of the shafts $b$ and provided with means $r'$ $r$ by which to communicate power to the accumulator $s$. Clutches $t'$ $t$ are arranged to connect and disconnect the shafts $q'$ and $q$ with and from the shaft $b$. This means for communicating power to an accumulator may be a pulley, as $r'$ in Fig. I, a pump, as $r$ in Fig. III, or any other practical appliance for the purpose, and the accumulator may be of any requisite character.

For convenience of illustration I have indicated electromagnetic clutches throughout Figs. I, II, and III. $u$ indicates a switch for the electric circuits $v$, which may be arranged either in series or parallel for operating the clutch $t$ of the shafts $b$ and $q'$ $q$ synchronously with one or more of the clutches $m$ $m'$ $m''$, so that when the load is caused to stand stationary the power will be diverted to shaft $q$, where it may be used for other purposes, and vice versa.

In Figs. I and III the electrical circuit $v$ is shown for connecting and disconnecting the clutches $m$, $m'$, and $m''$, and it is to be understood that in practical operation the same, together with said clutches $m$, $m'$, and $m''$ and the rope, serve as operative mechanism for simultaneously connecting the driving-pulley $d$ with one take-up pulley $h$ and disconnecting it from another pulley $i$ of different diameter. The clutches $m$ and $t$ are arranged to clutch on an open circuit, and clutches $m'$ and $m''$ are arranged to clutch, respectively, on two closed circuits, so that when $m'$ is clutched $m''$, $m$, and $t$ will simultaneously be unclutched and when $m''$ is clutched $m'$ $m$ $t$ will be unclutched, but when $m'$ and $m''$ are unclutched $m$ and $t$ will be clutched.

From the nature of the view the electrical circuit and the independent power-transmitting means do not appear in Fig. II, but are to be understood from Fig. III.

Any suitable tension device may be employed to compensate for any elongation or contraction of the rope. For this purpose $w$ indicates screws for raising and lowering the shaft $x$ of pulleys $i$ and $k$.

In Fig. VI, $b^2$ indicates a power-shaft carrying the pulley $i^2$, which for the purpose of this illustration is assumed to be fixed to the shaft and to rotate therewith. $k^2$ is a loose pulley on the shaft, and $m^2$ a clutch device to connect and disconnect the pulley $k^2$ with and from the pulley $i^2$. The clutch device is not illustrated in detail, as any of many forms of clutch devices may be applied for this purpose by any mechanic skilled in the art. In this view the load is divided into a heavier portion $c^2$ and a lighter portion $c^{2\prime}$. $j^2$ indicates a load-pulley fastened to the heavier portion, and $f^2$ a load-pulley fastened to the lighter portion, of the load. $n^2$ indicates the endless rope continuously driven by the pulley $i^2$ in the direction of the arrow. It is not to be lost sight of, however, that it is immaterial to this invention whether the power for driving the rope be applied through the pulley $i^2$ or through some other means, the primary purpose of these pulleys and the connecting and disconnecting device being to cause one portion of the rope to govern the speed of another portion.

For convenience of description the pulleys $i^2$ and $k^2$ are said to be in two loop members 14 and 15, respectively, of the rope, and the load-pulleys $f^2$ and $j^2$ are said to be in two bights 16 and 17 of the rope. When the pulley $k^2$ is connected with the pulley $i^2$, the friction of the loop member 15 upon the pulley $k^2$ will prevent the rope in said loop member from running at as high speed as the rope in the loop member 14, so that the pulley $i^2$ will take up the rope from the bight 17 and pay it to the bight 16 more rapidly than the pulley $k^2$ will take the rope up from the bight 16 and pay it to the bight 17. This shortens the bight 17 and lengthens the bight 16, causing the load $c^2$ to ascend while the load $c^{2\prime}$ descends. By disconnecting the pulley $k^2$, so that it will revolve freely upon the shaft $b^2$, the rope in the loop member 15 will thus be allowed to respond to the excess of weight in $c^2$ and to run faster over the pulley $k^2$ than the rope in the loop member 14 is being carried by the pulley $i^2$, thus lengthening the bight 17 and shortening the bight 16, and thereby raising the counterweight $c^2$.

In the form shown in Fig. VII, $a^3$ indicates a motor with shaft $b^3$, constituting the prime mover for applying power to the endless rope $n^3$ through the stationary pulley $i^3$. $k^3$ indicates another stationary pulley, around which the endless rope is bent. $f^3$ and $j^3$ indicate the two load-pulleys dividing the endless rope into the two loop members 14 and 15. 18 and 18' indicate two sustaining-pulleys. The loop member 14 runs around the pulleys $i^3$ and 18. The loop 15 runs around pulley $k^3$ and 18'. $m^3$ indicates Evans cones, which constitute suitable speed changing and conserving means for regulating the relative speeds of the loop members, which are bent around the pulley $i^3$ and the pulley $k^3$, respectively. By means of the Evans cones the relative rates of rotation of the pulleys $i^3$ and $k^3$ can be appropriately changed. When the belt 20 of the cones is adjusted to cause the pulley $k^3$ to rotate at a higher speed than the pulley $i^3$, the pulley $k^3$ will take up the rope from the bight 16 and pay it out to the bight 17 faster than the pulley $i^3$ will take the rope from the bight 17 and pay it to the bight 16, and consequently the bight 16 will be shortened and the bight 17 correspondingly lengthened, so that the load $c^3$ will rise.

When the belt 20 is adjusted to cause the pulleys $i^3$ and $k^3$ to rotate at the same speed, the rope will be taken up from one bight and paid out to the other bight at the same speed, and the load will therefore be held stationary.

When the belt 20 is adjusted to cause the pulley $i^3$ to run at a higher speed than the pulley $k^3$, the bight 17 will be shortened and the bight 16 lengthened, thus causing the load to descend. It is to be understood that I do not limit my invention by applying the power to the rope through pulley $i^3$ only, but that, as in the other forms, the power may be applied to the rope at any point by any other suitable means as well as by those shown. For example, the power might, if desired, be applied through pulley $k^3$ or through either of the pulleys 18 or 18'.

In the form shown in Fig. VIII, $b^4$ represents the shaft of the prime mover. 21 22 23 24 25 26 27 28 29 indicate pulleys. 31 32 33 34 35 36 37 38 39 indicate connecting and disconnecting means for said pulleys, respectively, to connect them with and disconnect them from one another, as required for the purpose of producing a variety of relative speeds between the respective loop members 14 and 15. The rope $n^4$ passes over the sustaining-pulleys 18 and 18'. 41 42 44 45 47 48 indicate idlers for directing the rope. The load-pulley $j^4$ carries one portion $c^4$ of the load, and the load-pulley $f^4$ carries the other portion of the load $c^{4\prime}$. The pulleys 26 and 27 are in different loop members and are of one diameter, and the pulleys 21, 22, 24, 25, 28, and 29 are of diameters different therefrom and different from each other. The pulleys 21 22 23 27 28 29 are in the loop member 15 of the rope, and pulleys 24 25 26 are in the loop member 14 of the rope. When any one of the pulleys 21 22 23 27 28 29 is connected to rotate synchronously with any one of the pulleys 24 25 26, the speeds of the loops 14 and 15 will be positively controlled the one by the other. For instance, if the pulleys 26 and 27 are connected with each other through their respective connecting and disconnecting means and the shaft $b^4$ the portions of the rope in the loops 14 and 15 will move at one speed and the lengths of the bights 16 and 17 will remain unchanged; but when the pulley 21 is connected with the pulley 24, all the other pulleys being loose to rotate freely, the rope traveling in the direction of the arrow, the pulley 21 will pay out the rope from bight 17 to bight 16 slower than the pulley 24 will pay out the rope from bight 16 to bight 17, and this will cause the pulley $f^4$ and the weight $c^{4\prime}$ to rise, while the pulley $j^4$ and its load $c^4$ will descend. To give a higher speed to the load, the pulley 21 may be disconnected from the pulley 24 and connected with the pulley 25. To still increase the speed, it may be disconnected from pulley 25 and connected with the pulley 26. The relative speeds may be changed with great variety by appropriately connecting any one of the pulleys which controls one loop with any one of the pulleys which controls the other loop, only two pulleys—one in each loop member—being connected through the shaft at the same time.

It is to be understood that the power for driving the endless rope may be applied to such rope through the shaft $b^4$ or that it may be applied to the rope at any point through any suitable means. (Not shown.)

In the form shown in Fig. IX the load $c^5$ is provided on opposite sides with load-pulleys $f^5$ and $j^5$, which divide the endless rope $n^5$ into the two loop members 14 15. The loop member 15 is led around a pulley $k^5$ and around a pulley $e^5$, and the loop member 14 is led around a pulley $h^5$ and around a pulley $i^5$. Means $m^5$ are provided for connecting and disconnecting the pulley $e^5$ and the pulley $h^5$ with and from each other, and means $m^{5\prime}$ are provided for connecting and disconnecting the pulley $i^5$ and the pulley $k^5$ with and from each other. When the pulleys $i^5$ and $k^5$ are connected with each other, the pulleys $e^5$ $h^5$ being disconnected from each other and the endless rope running in the direction of the arrow, the bight 16 will be shortened and the bight 17 lengthened, thus raising the load $c^5$. When the pulleys $i^5$ $k^5$ are disconnected and the pulleys $e^5$ and $h^5$ are connected with each other, the bight 16 will lengthen and the bight 17 will shorten, thus lowering the load $c^5$. The parts $o^5$, $p^5$, 51, 52, and 53 indicate mechanism for holding the load stationary when the connecting devices $m^5$ $m^{5\prime}$ are disconnected, so that the load may be intermittently stopped regardless of the movement of the endless rope. Of these parts $o^5$ indicates a brake-rope fastened to the load $c^5$. This rope runs over pulleys $p^5$ and 53. 52 indicates a brake to be applied to the pulley 51, which is fastened to and rotates with the pulley $p^5$, which is driven by the brake-rope $o^5$. When the clutches $m^5$ $m^{5\prime}$ are disconnected and the brake is applied, the brake-rope $o^5$ and the load are held stationary.

In Figs. X and XI, I have shown an arrangement of pulleys, ropes, and connecting and disconnecting devices by means of which the elevator-car $c^6$ can at will be raised, lowered, and held stationary by the simple connecting and disconnecting of appropriate clutches. In these two views all of the controlling-pulleys are shown arranged overhead. The car $c^6$ is connected with the counterweight $c^{60}$ by the rope $o^6$, which passes over the sustaining-pulley $p^6$ after the manner of arrangement shown in Figs. I, II, III, and V. $a^6$ indicates the motor to drive a pulley $a^7$. The endless rope $n^6$ is bent around the pulley $a^7$ and is led thence to the near side of the pulley $i^6$, around which it is bent to the far side, and thence to the far side of the pulley $a^7$, around which it is bent to the near side and led thence again to the near side of the pulley $i^6$, around which it is bent to the far side and led thence to the far side of the load-pulley $f^6$, around which it is bent to the near side and led thence in the direction of the triple-barbed arrow to the near side of the pulley $k^6$ over which it is led to the top of the pulley $e^6$, around which it is bent to the lower side and led thence to the lower side of pulley $k^6$, around which it is bent to the upper side and led thence again to the top of pulley $e^6$, over which it is bent and led thence to the far side of the pulley $d^6$, around which it is bent to the near side and led thence to the near side of pulley $e^6$, around which it is bent to the far side and led thence to the far side of the load-pulley $j^6$, around which it is bent to the near side and led thence to the near side of pulley $h^6$, around which it is bent to the far side and led thence to the far side of pulley $g^6$, under which it is bent and led to the under side of the driving-pulley $a^7$ and to the place of beginning.

$b^6$ indicates the motor-shaft. In this form the pulleys $d^6$ and $g^6$ are of one diameter. The pulleys $e^6$ and $h^6$ are of different diameters, and the pulleys $i^6$ and $k^6$ are of different diameters. Means are provided for connecting the pulleys $d^6$ and $g^6$ together. Other means are provided for connecting the pulleys $e^6$ and $h^6$ together, and other means are provided for connecting the pulleys $i^6$ and $k^6$ together. For convenience of illustration I have shown the pulleys $d^6$, $e^6$, and $k^6$ as mounted upon hollow shafts 80, 81, and 82, and pulleys $g^6$, $h^6$, and $i^6$ as mounted upon shafts 83 84 85, respectively, which pass through the said hollow shafts 80, 81, and 82, respectively, and friction-clutches $m^{6'''}$ $m^6$ $m^{6''}$ are mounted on the ends of the shafts 80, 81, and 82, respectively, to connect and disconnect them, respectively, with and from each other. From the nature of the views hollow shaft 80, which is like shaft 81, is not shown; but its location is indicated by the arrow leading from the character 80 in Figs. X and XI. The load-pulleys $f^6$ $j^6$, as in the other instances described by the other views, divide the endless rope $n^6$ into the two loop members 14 and 15. The pulleys $d^6$, $e^6$, and $k^6$ are all in the loop member 14, and the pulleys $g^6$, $h^6$, $i^6$, and $a^7$ are all in the loop 15.

When the pulleys $d^6$ and $g^6$, which are of one diameter, are connected to rotate synchronously, the other pulleys being free to rotate independently of each other, the speed of the two loop members 14 and 15 will be the same and the load will remain stationary. When the pulleys $e^6$ and $h^6$, which are of different diameters, are connected to rotate synchronously and the other pulleys are free to rotate independently, the endless rope will be taken from the bight 17 and paid to the bight 16 faster than it will be taken from the bight 16 and paid to the bight 17, thereby lengthening the bight 16 and shortening the bight 17 and allowing the car to descend while the counterweight $c^{60}$ is drawn up.

When the pulleys $i^6$ and $k^6$, which are of different diameters, are connected to rotate synchronously, the other pulleys being free to rotate independently and the endless rope moving in the direction indicated by the arrows, the endless rope will be taken from the bight 16 and paid to the bight 17 faster than it will be taken from the bight 17 and paid to the bight 16, thereby shortening the bight 16 and lengthening the bight 17, causing the elevator-car $c^6$ to be raised and allowing the counterweight $c^{60}$ to descend.

It is to be observed that when the limb of one bight 16 or 17 of the endless rope is connected with the other limb of such bight to take up the rope faster from that limb of the bight which is running from the load-pulley of that bight than it pays the rope to the limb which runs toward such load-pulley the bight will be shortened, and vice versa.

The counterweight or load device (shown in Figs. I, II, III, and IV) is provided with runners 90 and 91 for the tracks or way 92 93 of the elevator structure. The load-pulley $j$ is between the planes of said runners, and the endless rope passes on opposite sides of the load-pulley, between such pulley and the faces of the tracks 92 93, respectively. 94 95 indicate openings through the counterweight load device to allow the endless rope $n$ to pass on its way from and to the stationary pulleys above and below. By this construction and arrangement I secure superior compactness and am able to use smaller stationary pulleys than would otherwise be possible.

The practical operation of the apparatus shown in Figs. I to V, inclusive is substantially as follows: Assuming that the motors $a$ $a'$ are rotating and driving the shaft $b$ and that the driving-pulleys $d$ are fastened to such shaft and that the clutch $m$ is connecting the pulley $g$ with the pulley $d$ and that the clutches $m'$ and $m''$ are disconnected, thus allowing the pulleys $e$ and $h$ and $k$ and $i$ to run freely, then the car $c$ will remain stationary while the rope $n$ continues to run, because the connection between the two loops of the rope which are around pulleys $d$ and $g$, respectively, are driven at the same speed, for the reason that the pulleys $d$ and $g$ are of the same diameter and are rotating synchronously. At the same time the clutches $m$ are connected the clutch $t$ will be connected, so as to drive the secondary load indicated by the pump $r$ and the accumulator-tank $s$. Upon disconnecting the clutch $t$ and the clutch $m$ and connecting the clutch $m''$, thereby connecting the pulleys $i$ and $k$, while the other pulleys are free to rotate, being driven by pulley $d$, the counterweight $c^{20}$, $c^{30}$, or $c^{40}$, as the case may be, will descend, thereby causing the car to ascend by reason of the pulley $k$ winding the rope up from the pulley $j$ at a slower rate than the rope is being paid out to the pulley $j$ by the pulley $i$. If the clutch $m''$ be now disconnected, either the car can be brought to a standstill and held stationary again by the connection of the clutch $m$ or the clutch $m'$ may be connected while the other pulleys are free to rotate, thereby causing the counterweight $c^{20}$ $c^{30}$ $c^{40}$, as the case may be, to ascend while the car descends by reason of the pulley $e$ unwinding the rope to the pulley $f$ faster than the rope is being taken up from pulley $f$ by the pulley $h$.

In Fig. I, $r'$ represents the secondary load, the same being clutch-pulleys for driving any form of mechanism.

What I claim, and desire to secure by Letters Patent of the United States, is—

1. A device for applying power to intermittently move a load, comprising an endless rope formed in two loop members led around stationary pulleys in said loop members, respectively, and around two load-pulleys which are at the dividing bights, respectively, between said loop members; said stationary pulleys and load-pulleys and connectible and disconnectible speed-changing means for connecting one loop member to the other loop member whereby the speed of one loop member is regulated by the speed of the other loop member.

2. A device for applying power to intermittently move a load, comprising an endless rope formed in two loop members led around stationary pulleys in said loop members, respectively, and around two load-pulleys which are at the dividing bights, respectively, between said loop members; said stationary pulleys and load-pulleys and connectible and disconnectible speed changing and conserving means connecting one loop member to the other loop member whereby the speed of one loop member is regulated by the speed of the other loop member.

3. In a device for applying power to intermittently move a load, and including an endless rope and means for driving said rope continuously in one direction; the combination with said rope, of a pulley in one bight of said rope and fastened to the load to move the same; a pulley in another bight of the rope and fastened to the load to move the same; a stationary pulley in a loop member of the rope between the load-pulleys to take the rope from one side of the first load-pulley and pay it to one side of the second load-pulley; a stationary pulley in a loop member of the rope to take the rope from the other side of the second load-pulley and pay it to the other side of the first load-pulley; and connectible and disconnectible speed-changing means for connecting one loop member to the other loop member whereby the speed of one loop member is regulated by the speed of the other loop member.

4. In a device for applying continuous power of one direction, to intermittently move a load; the combination of an endless rope; means for driving said rope continuously in one direction; a pulley in one bight of said rope and fastened to the load to move the same; a pulley in another bight of the rope and fastened to the load to move the same; a stationary pulley in a loop member of the rope between the load-pulleys to take the rope from one side of the first load-pulley and pay it to one side of the second load-pulley; a stationary pulley in a loop member of the rope to take the rope from the other side of the second load-pulley and pay it to the other side of the first load-pulley; and connectible and disconnectible differential means for connecting one loop member to the other loop member.

5. A power-applying device comprising two pulleys fastened to a load to move the same; two stationary pulleys; an endless rope bent around all of said pulleys; means for driving the rope continuously in one direction; some of said pulleys being of smaller diameter than others of said pulleys; means for intermittently connecting a pulley of one diameter to a pulley of another diameter to move the load in one direction; and means for causing the load to move in the other direction.

6. Means for applying power from a prime mover having one direction, to move a load intermittently in opposite directions; comprising three pairs of pulleys, two of said pairs being composed of pulleys of unequal diameters; means for two of said pairs, to connect and disconnect the respective pulleys of such two pairs, respectively, with and from each other; and an endless rope connected with the prime mover to be driven in one direction, and running around all of said pulleys, and being around stationary pulleys toward and away from which the primary load moves, and around pulleys which are fastened to the primary load to be driven, and which form two loop members, which are respectively bent around opposite pulleys of said pairs of pulleys, respectively.

7. Means for applying power from a prime mover having one direction, to move a load intermittently in opposite directions; comprising two pairs of pulleys, each of said pairs being composed of pulleys of unequal diameters; means to connect and disconnect the respective pulleys of such two pairs, respectively, with and from each other; two pulleys fastened to the load to be driven; and an endless rope connected with a prime mover to be driven in one direction and running around all of said pulleys and being formed by said load-pulleys in two loops which are respectively bent around the opposite pulleys of said pairs of pulleys, and being around stationary pulleys toward and away from which the load moves.

8. Means for applying power from a prime mover having one direction, to move a load intermittently and to allow the load to remain stationary while the prime mover continues to run; comprising three pairs of stationary pulleys, two of said pairs being composed of pulleys of unequal diameters; means for connecting and disconnecting the respective pulleys of each of the pairs, respectively, with and from each other; and an endless rope connected with a prime mover to be driven in one direction and running around all of said pulleys and being around two pulleys which are fastened to the primary load, and which form the endless rope in two loop members, one of which is bent around one and the other around the other of the pulleys of the pairs respectively.

9. In a power-applying device including an endless rope and means for driving said rope continuously in one direction; the combination with said rope, of two pulleys fastened to a load to move the same; stationary pulleys; said endless rope being bent into loop members and led around all of said pulleys and one of said stationary pulleys being in one loop member and of smaller diameter than another of said stationary pulleys which is in any other loop member; and connectible and disconnectible means for intermittently connecting the stationary pulley of one diameter to the stationary pulley of another diameter to move the load in one direction, and to allow it to move in the other direction.

10. In a power-applying device, including an endless rope and means for driving said rope continuously in one direction; the combination with said rope, of two pulleys fastened to a load to move the same; stationary pulleys; said endless rope being bent around all of said pulleys and one of said stationary pulleys being of smaller diameter than another of said stationary pulleys; connectible and disconnectible means for intermittently connecting a stationary pulley of one diameter to a stationary pulley of another diameter to move the load in one direction; and means for causing the load to move in the other direction.

11. In a device for transmitting continuous power of one direction to intermittently move a load in opposite directions; the combination of a plurality of take-up pulleys, one of which is of a diameter different from that of another of said pulleys; a driving-pulley; a load to be moved; two pulleys fastened to the movable load; an endless rope running around all of said pulleys; and operative mechanism to simultaneously connect the driving-pulley with one and disconnect it from the other of the take-up pulleys which have different diameters; and vice versa.

12. A system for utilizing power from a single prime mover, having continuous motion in one direction, to move a load intermittently in opposite directions and to allow the load to remain stationary while the prime mover continues to run; comprising the prime mover, three pairs of stationary pulleys, two of said pairs being composed of pulleys of unequal diameters; and the other pair being of one diameter, means for connecting and disconnecting the respective pulleys of each of the pairs, respectively, with and from each other; an endless rope connected with a prime mover to be driven in one direction and running around all of said pulleys and being around two pulleys which are fastened to the primary load; independent power-transmitting means; a device for connecting and disconnecting such independent power-transmitting means with and from the prime mover; and means for simultaneously operating such device and said means for connecting and disconnecting the said pair of pulleys of one diameter.

13. In means for applying power from a prime mover having one direction, to move a load intermittently in opposite directions; the combination of three pairs of stationary pulleys, two of said pairs being composed of pulleys of unequal diameters; means for two of said pairs to connect and disconnect the respective pulleys of such two pairs, respectively, with and from each other; and an endless rope connected with a prime mover to be driven in one direction, and running around all of said pulleys, and being around stationary pulleys toward and away from which the primary load moves and around pulleys which are fastened to the primary load to be driven, and being bent toward one side only of its axis.

14. A device for applying continuous power of one direction, to intermittently move a load; provided with pulleys fastened to the load to move the same; stationary pulleys; speed changing and conserving power-transmitting means substantially as set forth; and a rope bent toward one side only of its axis and running around said pulleys and operatively connected with said speed changing and conserving power-transmitting means substantially as set forth.

15. In a power-transmitting device, the combination of a track or way; a load device provided with runners for said track or way;

a pulley between the planes of said runners; stationary pulleys at opposite ends of the track or way; and an endless rope bent around the pulleys and passing on opposite sides of the load-pulley between such pulley and the faces of the tracks, respectively.

16. A system for moving a plurality of loads, comprising a power-shaft; a plurality of driving-pulleys fixed on the shaft; a plurality of devices for applying power to intermittently move the said plurality of loads, respectively, each comprising an endless rope formed in two loop members led around stationary pulleys in said loop members, respectively, and around two load-pulleys which are at the dividing bights, respectively, between the said loop members; and connectible and disconnectible speed-changing means for said ropes respectively, each being arranged to transmit power from one loop member of its rope to the other loop member of its rope to control the relative speeds of said loop members.

17. A device for applying power to intermittently move a load, comprising an endless rope formed in two loop members led around stationary pulleys in said loop members, respectively, and around two load-pulleys which are at the dividing bights, respectively, between said loop members; said stationary pulleys and load-pulleys; and pulleys of varying diameters for connecting one loop member to the other loop member whereby the speed of one loop member is regulated by the speed of the other loop member.

18. A system for utilizing power from a single prime mover having continuous motion in one direction, to move a load intermittently in opposite directions and allow the load to remain stationary while the prime mover continues to run; comprising the prime mover; a pair of stationary pulleys the same being composed of pulleys of unequal diameter; means for connecting and disconnecting respective pulleys of the said pair, respectively, with and from each other; an endless rope connected with the prime mover to be driven in one direction, and running around all of said pulleys and being around two pulleys which are fastened to the primary load; independent power-transmitting means; a device for connecting and disconnecting such independent power-transmitting means with and from the prime mover; and means for simultaneously operating such device and said means for connecting and disconnecting the said pairs of pulleys of one diameter.

In testimony whereof I have signed my name to this specification, in the presence of two subscribing witnesses, at Los Angeles, California, this 27th day of February, 1900.

HOMER LAUGHLIN, Jr.

Witnesses:
  JAMES R. TOWNSEND,
  FRANCIS M. TOWNSEND.